United States Patent
Hao et al.

(10) Patent No.: US 11,766,681 B1
(45) Date of Patent: Sep. 26, 2023

(54) LIQUID OUTLET DEVICE FOR REAGENT KIT

(71) Applicant: Shijiazhuang Hipro Biotechnology Co., Ltd., Shijiazhuang (CN)

(72) Inventors: Shushun Hao, Shijiazhuang (CN); Yanjun Sui, Shijiazhuang (CN); Yi Liu, Shijiazhuang (CN); Lizhu Chen, Shijiazhuang (CN); Zhaohui Yao, Shijiazhuang (CN)

(73) Assignee: Shijiazhuang Hipro Biotechnology Co., Ltd., Shijiazhuang (CN)

( * ) Notice: Subject to any disclaimer, the term of this patent is extended or adjusted under 35 U.S.C. 154(b) by 0 days.

(21) Appl. No.: 18/199,313

(22) Filed: May 18, 2023

Related U.S. Application Data

(63) Continuation of application No. PCT/CN2021/117667, filed on Sep. 10, 2021.

(30) Foreign Application Priority Data

Nov. 23, 2020 (CN) .......................... 202011317359.3

(51) Int. Cl.
*B05B 1/30* (2006.01)
*B05B 15/65* (2018.01)
*B01L 3/00* (2006.01)

(52) U.S. Cl.
CPC .............. *B05B 1/3013* (2013.01); *B01L 3/52* (2013.01); *B05B 15/65* (2018.02); *B01L 2400/0478* (2013.01); *B01L 2400/0622* (2013.01)

(58) Field of Classification Search
CPC .......... B05B 1/3013; B05B 15/65; B01L 3/52; B01L 2400/0478; B01L 2400/0622
(Continued)

(56) References Cited

U.S. PATENT DOCUMENTS

| 4,570,904 A | | 2/1986 | Mullally |
| 4,909,445 A | * | 3/1990 | Schoonover ............ F22G 5/123 239/584 |

(Continued)

FOREIGN PATENT DOCUMENTS

| CN | 1126311 A | 7/1996 |
| CN | 105531035 A | 4/2016 |

(Continued)

OTHER PUBLICATIONS

International Search Report and Written Opinion received in Patent Cooperation Treaty Application No. PCT/CN2021/117667, dated Dec. 8, 2021.

*Primary Examiner* — Steven J Ganey
(74) *Attorney, Agent, or Firm* — AP3 Law Firm PLLC

(57) ABSTRACT

A liquid outlet device for reagent kit includes a spray pipe and a nozzle that is arranged at one end of the spray pipe, where each blocking strip extends along an axial direction of the spray hole and one end of each blocking strip is provided with a shoulder that extends towards a center of the spray hole. The spray pipe includes a spray pipe body, a plurality of blocking strips and a magnet bar that is movable along the axial direction of the spray hole in a space defined by the shoulders and the blocking strips. The nozzle includes an annular sleeve connected with the spray pipe body through threaded connection or clamped connection, an end plate, a nozzle pipe, a conical nozzle opening and an annular blocking flange.

9 Claims, 2 Drawing Sheets

(58) Field of Classification Search
USPC .................................... 239/583, 584, 585.1
See application file for complete search history.

(56) References Cited

U.S. PATENT DOCUMENTS

| | | | | |
|---|---|---|---|---|
| 6,027,050 | A * | 2/2000 | Rembold | F02M 61/162 |
| | | | | 239/585.1 |
| 2010/0313553 | A1* | 12/2010 | Cavanagh | F01N 3/2066 |
| | | | | 239/585.1 |

FOREIGN PATENT DOCUMENTS

| | | | |
|---|---|---|---|
| CN | 107847949 | A | 3/2018 |
| CN | 111308110 | A | 6/2020 |
| CN | 112431930 | A | 3/2021 |
| CN | 112526153 | A | 3/2021 |
| DE | 102009008056 | A1 | 8/2010 |
| DE | 102015003554 | A1 | 9/2016 |

\* cited by examiner

LIQUID OUTLET DEVICE FOR REAGENT KIT

CROSS-REFERENCE TO RELATED APPLICATIONS

This application is a continuation application of International Application No. PCT/CN2021/117667, filed on Sep. 10, 2021, which claims priority to Chinese Patent Application No. CN 202011317359.3, filed on Nov. 23, 2020. The disclosures of the aforementioned applications are hereby incorporated herein by reference in their entireties.

TECHNICAL FIELD

The application belongs to the technical field of liquid outlet structure, and particularly relates to a liquid outlet device for reagent kit.

BACKGROUND

Reagent kits are common laboratory supplies used to preserve reaction reagents. In the prior art, in a laboratory, pipettes or syringes are required to draw the reagents out the kits before injecting the reagents into an experimental instrument. When drawing different reagents, it is required to replace the pipette tip or clean the syringe and the needle of the syringe, which is cumbersome and time-consuming. And, the amount of reagent drawn out is easily affected by the operator's operation method, which is not conducive to conversion to automated instruments for operation.

SUMMARY

This and other problems are generally solved or circumvented, and technical advantages are generally achieved, by embodiments of the present application which provides a liquid outlet device for reagent kit.

Technical Problems

The application provides a liquid outlet device for reagent kit. Its structure is simple and compact. It can take liquid accurately and realize automation easily.

Technical Solutions

The technical solutions adopted by the present application are as follows.

The present application provides a liquid outlet device for reagent kit including a spray pipe and a nozzle that is arranged at one end of the spray pipe.

The spray pipe includes a spray pipe body, a spray hole extending along an axial direction of the spray pipe body and a magnet bar arranged in the spray hole. A plurality of blocking strips are uniformly arranged on an inner wall of the spray hole, where each blocking strip extends along an axial direction of the spray hole. One end of each blocking strip is provided with a shoulder that extends towards a center of the spray hole. The magnet bar is able to move along the axial direction of the spray hole in a space defined by a plurality of shoulders and the plurality of blocking strips.

The nozzle includes an annular sleeve, an end plate provided at one end of the annular sleeve, a nozzle pipe provided at a center of the end plate and a conical nozzle opening formed at an end of the nozzle pipe. An annular blocking flange surrounding the nozzle pipe is further provided on the end plate and an annular groove is formed between the nozzle pipe and the annular blocking flange. A liquid channel communicated with an interior of the annular sleeve is formed in the nozzle pipe and the conical nozzle opening.

The annular sleeve and the spray pipe body are connected through threaded connection or clamped connection.

In a possible implement, one end of the spray pipe body is located close to the plurality of shoulders and an outer side wall of the end of the spray pipe body is provided with an external thread, and the other end of the annular sleeve is an open end and is provided with an internal thread matching the external thread.

In a possible implement, one end of the spray pipe body that is located far away from the plurality of shoulders is provided with an annular connecting part, an outer side wall of the annular connecting part is provided with an annular convex, and the other end of the annular sleeve is an open end and is provided with an annular concave matching the annular convex.

In a possible implement, a sealing gasket is arranged in the annular sleeve.

In a possible implement, the magnet bar is cylinder shaped.

In a possible implement, the number of the plurality of blocking strips is three or more than three.

In a possible implement, a diameter of a cylinder space enclosed by the plurality of shoulders is less than a section diameter of the magnet bar, and a diameter of a cylinder space enclosed by the plurality of blocking strips is greater than the section diameter of the magnet bar.

Advantageous Effects of the Disclosure

The advantageous effects of the liquid outlet device for reagent kit provided by the present application are as follows: the spray pipe and the nozzle are connected through threaded connection or clamped connection, which facilitates disassembly and the replacement of the nozzle.

The shoulders in the spray hole of the spray pipe body are used to prevent the magnet bar from blocking the liquid inlet end of the spray pipe. A gap is formed between two adjacent blocking strips for liquid flow. Liquid can flow in the gaps and will not be blocked by the magnet bar. When the magnet bar moves towards the nozzle to the other end of the spray pipe, the magnet bar can block the nozzle connected on the spray pipe. The reciprocating movement of the magnet bar in the spray hole realizes the opening and closing of the spray pipe.

The outer side wall of the conical nozzle opening of the nozzle is designed as a conical structure, which can prevent droplet from adhering to the lower end of the nozzle. The nozzle pipe is surrounded by the annular blocking flange and the annular groove, which can prevent the slender nozzle pipe from being damaged by external forces. When installing a container for receiving liquid reagent flowing out the nozzle, the side walls of the annular groove can clamp the sealing cover of the container to prevent the sealing cover from being disengaged. The liquid outlet device provided by the present application is easy to install and has good liquid outlet effect.

The structure of the liquid outlet device provided by the present application is ingenious and simple, and it is conducive to achieving automation and miniaturization.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

In the following, referencing to the drawings, the technical solutions of the embodiments of the present application are described clearly and completely. It should be appreciated, however, that the concepts disclosed herein can be embodied in a wide variety of specific contexts. The specific embodiments discussed are merely illustrative, and do not limit the scope of the claims.

Embodiment 1

Figure 1:
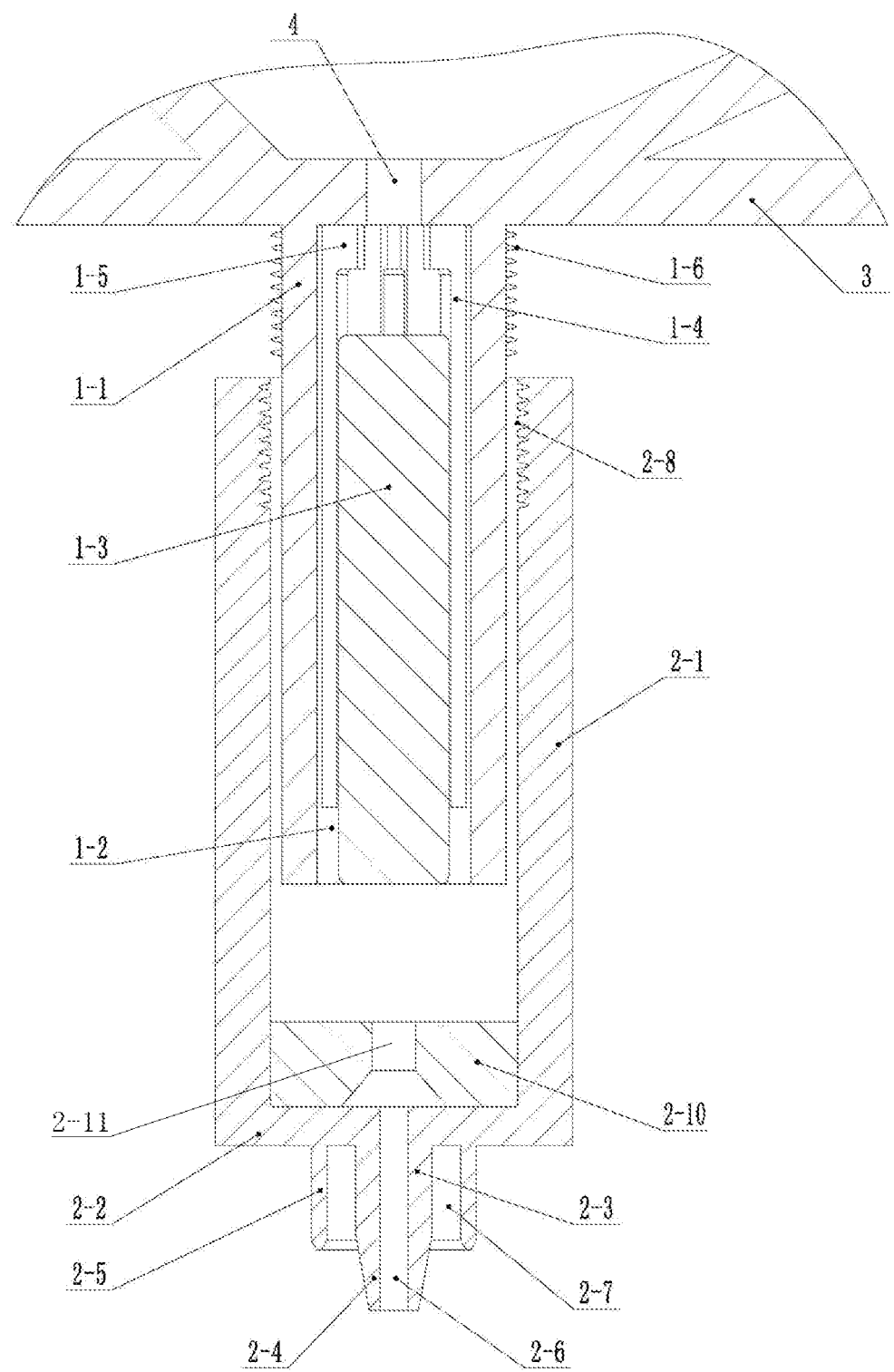
FIG. 1 is a schematic sectional view of the liquid outlet device for reagent kit according to an embodiment 1.

As shown in FIG. 1, the liquid outlet device for reagent kit includes a spray pipe and a nozzle that is arranged at one end of the spray pipe.

The spray pipe includes a spray pipe body 1-1, a spray hole 1-2 extending along the axial direction of the spray pipe body 1-1 and a magnet bar 1-3 arranged in the spray hole 1-2. A plurality of blocking strips 1-4 are uniformly arranged on the inner wall of the spray hole 1-2, where each blocking strip 1-4 extends along the axial direction of the spray hole 1-2. One end of each blocking strip 1-4 is provided with a shoulder 1-5 that extends towards the center of the spray hole 1-2. The magnet bar 1-3 is able to move along the axial direction of the spray hole 1-2 in a space defined by a plurality of shoulders 1-5 and the plurality of blocking strips 1-4.

The spray pipe body 1-1 is fixed to reagent kit 3. The spray hole 1-2 in the spray pipe body 1-1 is communicated with the liquid outlet hole 4 of the reagent kit 3. The end of the spray pipe body 1-1 close to the shoulders is a liquid inlet end and the liquid reagent in the reagent kit can flow into the spray hole 1-2 of the spray pipe body 1-1 through this liquid inlet end.

The diameter of a cylinder space formed by all the shoulders 1-5 is less than the section diameter of the magnet bar 1-3, and the diameter of a cylinder space formed by all the blocking strips 1-4 is greater than the section diameter of the magnet bar 1-3. Therefore, the magnet bar 1-3 is able to reciprocate in the cylinder space formed by all the blocking strips 1-4, but when it moves towards the liquid outlet hole 4 of the reagent kit 3 and contacts the shoulders 1-5, it is blocked by the shoulders 1-5 and cannot continue to move to prevent from blocking the liquid outlet hole 4. A gap is formed between two adjacent blocking strips 1-4 and liquid can flow in the spray hole 1-2 through the gaps without being blocked by the magnet bar 1-3.

The nozzle includes an annular sleeve 2-1, an end plate 2-2 provided at one end of the annular sleeve 2-1, a nozzle pipe 2-3 provided at the center of the end plate 2-2 and a conical nozzle opening 2-4 formed at an end of the nozzle pipe 2-3. An annular blocking flange 2-5 surrounding the nozzle pipe 2-3 is further provided on the end plate 2-2 and an annular groove 2-7 is formed between the nozzle pipe 2-3 and the annular blocking flange 2-5. A liquid channel 2-6 communicated with the interior of the annular sleeve 2-1 is formed in the nozzle pipe 2-3 and the conical nozzle opening 2-4.

The outer side wall of the conical nozzle opening 2-4 of the nozzle is designed as a conical structure, which can prevent droplet from adhering to the lower end of the nozzle and forming a hanged-droplet. The nozzle pipe 2-3 is conical frustum shaped or cylindrical. The nozzle pipe 2-3 is surrounded by the annular blocking flange 2-5 and the annular groove 2-7, which can prevent the slender nozzle pipe 2-3 from being damaged by external forces. When installing a container for receiving liquid reagent flowing out the nozzle, the annular groove 2-7 can clamp the sealing cover of the container to prevent the sealing cover from being disengaged.

The annular sleeve 2-1 and the spray pipe body 1-1 are connected through threaded connection. Specifically, the end of the spray pipe body 1-1 located close to the shoulders 1-5 is provided with an external thread 1-6, that is, the outer side wall of this end of the spray pipe body 1-1 is provided with an external thread 1-6. The open end of the annular sleeve 2-1 is provided with an internal thread 2-8 matching the external thread 1-6.

There are no shoulders at the end of the spray pipe body 1-1 which is inserted into the annular sleeve 2-1. Therefore, the magnet bar can contact the liquid channel in the nozzle pipe 2-3 to prevent liquid from entering the nozzle, thus achieve the purpose of sealing and blocking.

A sealing gasket 2-10 is arranged in the annular sleeve 2-1. The center of the sealing gasket 2-10 is provided with a through hole 2-11. The diameter of the end of the through hole 2-11 close to the spray hole 1-2 is less than the diameter of the end close to the liquid channel 2-6, which is benefit for sealing and blocking the end close to the spray hole 1-2. The sealing gasket 2-10 can seal the gaps between the spray pipe body 1-1 and annular sleeve 2-1 to prevent liquid leaking. The magnet bar 1-3 is cylindrical. The number of the blocking strips 1-4 is three or more than three and the blocking strips 1-4 uniformly distributed on the inner wall of the spray hole 1-2. The spray pipe shown in FIG. 1 has six blocking strips 1-4. Too few blocking strips (one or two) cannot restraint the magnet bar sufficiently causing that the magnet bar cannot maintain the correct posture during movement thus contacting to the inner wall of the nozzle, and too many blocking strips will make the gap between two adjacent blocking strips too narrow, both of which will cause the flow resistance of liquid reagent to increase.

To drive the magnet bar reciprocating in the spray hole 1-2, an electromagnet may be sleeved at the liquid inlet end of the spray pipe body 1-1 and a permanent magnet ring may be sleeved at the annular connecting part 1-7 of the spray pipe body 1-1. The polarity of the end of the magnet bar close to the permanent magnet ring and the polarity of the end of the permanent magnet ring close to the magnet bar are opposite. Therefore, the permanent magnet ring can attract the magnet bar to seal and block the nozzle, thus stopping the liquid from flowing out. When it is time to let the liquid flow out, energize the electromagnet. The magnetic force of the electromagnet is greater than that of the permanent magnet ring. Therefore, the magnet bar can be attracted to the liquid inlet end of the spray pipe and contacts the shoulders, and the liquid reagent can flow into the nozzle through the gaps between the blocking strips 1-4 and flow out finally.

Embodiment 2

Figure 2:
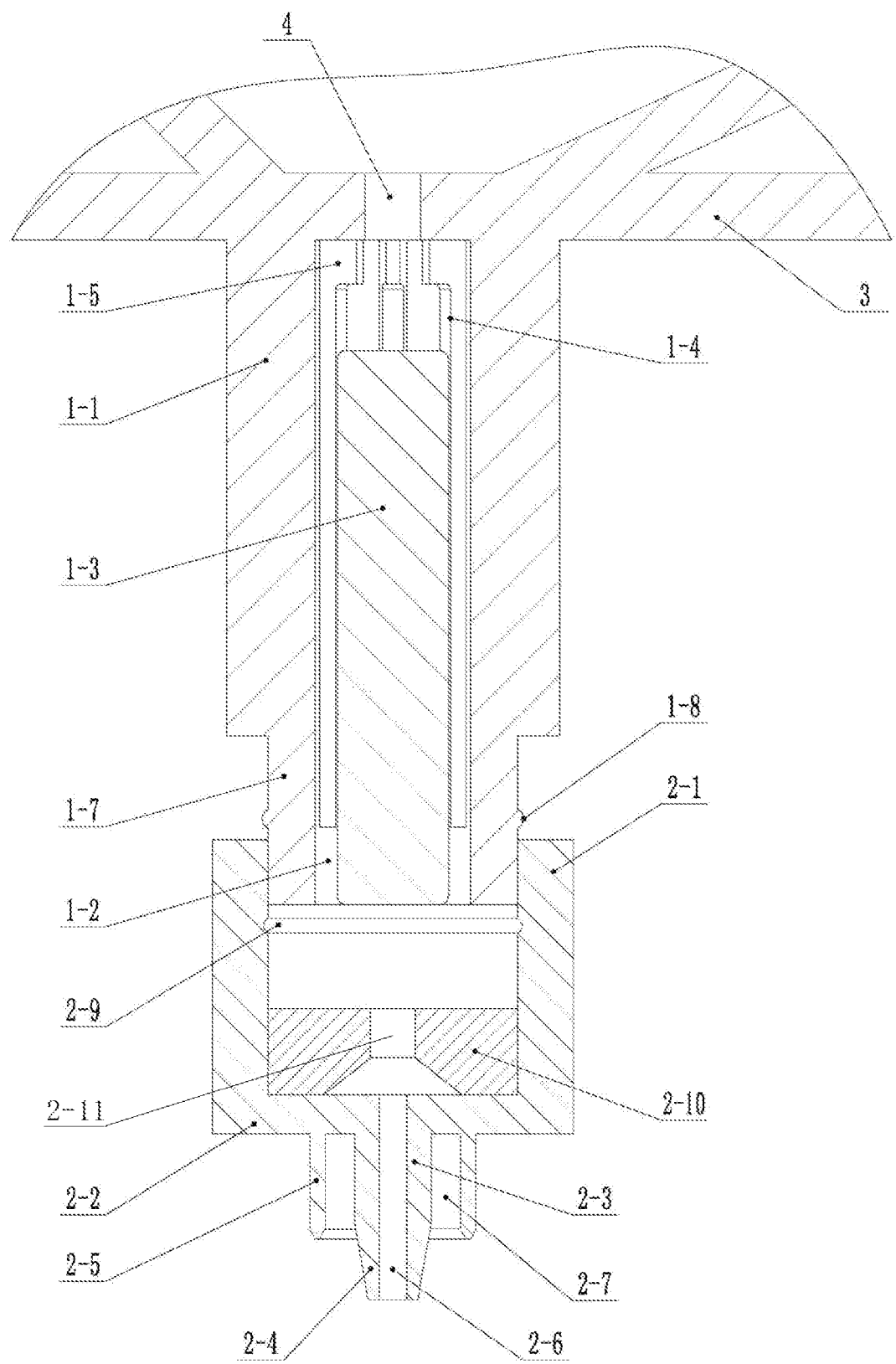
FIG. 2 is a schematic sectional view of the liquid outlet device for reagent kit according to an embodiment 2.

The liquid outlet device provided by the embodiment 2 is the same as that provided by the embodiment 1 expect that, in the embodiment 2, as shown in FIG. 2, the annular sleeve 2-1 and the spray pipe body 1-1 are connected through clamped connection. Specifically, the end of the spray pipe body 1-1 that is located far away from the shoulders 1-5 is provided with an annular connecting part 1-7. The outer side wall of the annular connecting part 1-7 is provided with an annular convex 1-8, and the open end of the annular sleeve 2-1 is provided with an annular concave 2-9 matching the annular convex 1-8. The annular concave 2-9 is coordinated with the annular convex 1-8 on the spray pipe body 1-1. The installation can be achieved by inserting the annular connecting part 1-7 into the annular sleeve 2-1 which is convenient and fast, and the installation is secure and will not accidentally disengage. The liquid reagent can flow through the liquid outlet of the reagent kit and the spray pipe, then flow out from the liquid channel in the nozzle.

The above descriptions are only preferred embodiments of the present disclosure, and are not intended to limit the present disclosure. Any modifications, equivalent replacements and improvements made within the spirit and principle of the present disclosure shall be included within the protection scope of the present disclosure.

Moreover, the scope of the present disclosure is not intended to be limited to the particular embodiments described here. As one of ordinary skill in the art will readily appreciate from the disclosure of the present disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The invention claimed is:

1. A liquid outlet device for a reagent kit, comprising:
a spray pipe comprising:
a spray pipe body provided with a spray hole extending along an axial direction of the spray pipe body;
a plurality of blocking strips uniformly arranged on an inner wall of the spray hole, wherein each blocking strip extends along an axial direction of the spray hole, and a first end of each blocking strip is provided with a shoulder that extends towards a center of the spray hole; and
a magnet bar arranged in the spray hole, wherein the magnet bar is movable along the axial direction of the spray hole in a space defined by a plurality of shoulders and the plurality of blocking strips; and
a nozzle arranged at a first end of the spray pipe, comprising:
an annular sleeve connected with the spray pipe body through threaded connection or clamped connection;
an end plate provided at a first end of the annular sleeve;
a nozzle pipe provided at a center of the end plate;
a conical nozzle opening formed at a first end of the nozzle pipe, wherein a liquid channel communicable with an interior of the annular sleeve is formed in the nozzle pipe and the conical nozzle opening; and
an annular blocking flange provided on the end plate, wherein the annular blocking flange surrounds the nozzle pipe to form an annular groove between the nozzle pipe and the annular blocking flange.

2. The liquid outlet device according to claim 1, wherein a first end of the spray pipe body is located close to the plurality of shoulders, an outer side wall of the first end of the spray pipe body is provided with an external thread, and a second end of the annular sleeve is an open end and is provided with an internal thread matching the external thread.

3. The liquid outlet device according to claim 2, wherein a sealing gasket is arranged in the annular sleeve.

4. The liquid outlet device according to claim 1, wherein a second end of the spray pipe body that is located away from the plurality of shoulders is provided with an annular connecting part, an outer side wall of the annular connecting part is provided with an annular convex, and a second end of the annular sleeve is an open end and is provided with an annular concave matching the annular convex.

5. The liquid outlet device according to claim 4, wherein a sealing gasket is arranged in the annular sleeve.

6. The liquid outlet device according to claim 1, wherein a sealing gasket is arranged in the annular sleeve.

7. The liquid outlet device according to claim 1, wherein the magnet bar is cylinder shaped.

8. The liquid outlet device according to claim 1, wherein a number of the plurality of blocking strips is three or more than three.

9. The liquid outlet device according to claim 8, wherein a diameter of a cylinder space formed by the plurality of shoulders is less than a section diameter of the magnet bar, and a diameter of a cylinder space formed by the plurality of blocking strips is greater than the section diameter of the magnet bar.

* * * * *